April 9, 1957 W. G. CLARK 2,788,145
HOUSE MOVING TRAILER
Filed March 10, 1955 7 Sheets-Sheet 1

Walter G. Clark
INVENTOR
BY
ATTORNEYS.

April 9, 1957 — W. G. CLARK — 2,788,145
HOUSE MOVING TRAILER
Filed March 10, 1955 — 7 Sheets-Sheet 2

Walter G. Clark
INVENTOR

April 9, 1957 W. G. CLARK 2,788,145
HOUSE MOVING TRAILER
Filed March 10, 1955 7 Sheets-Sheet 3
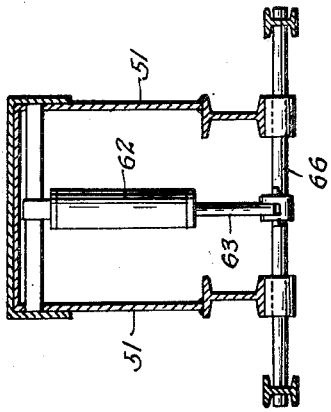
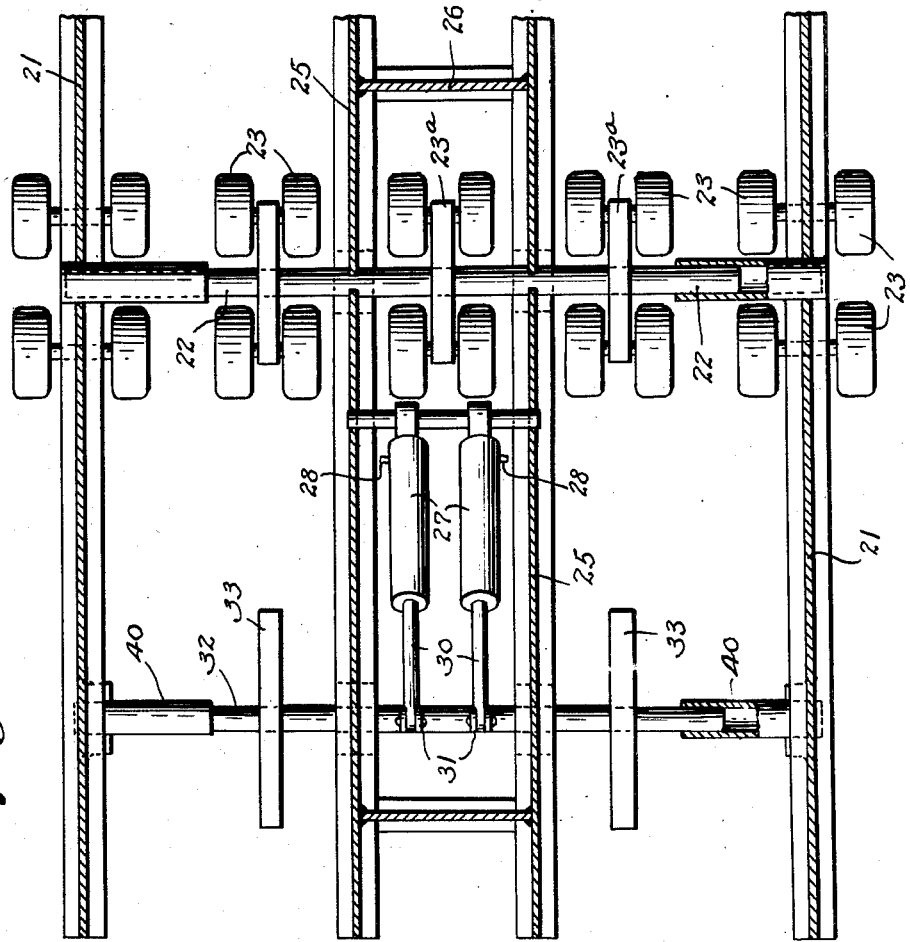
Walter G. Clark
INVENTOR
BY CASnow&Co.
ATTORNEYS.

April 9, 1957 W. G. CLARK 2,788,145
HOUSE MOVING TRAILER
Filed March 10, 1955 7 Sheets-Sheet 4
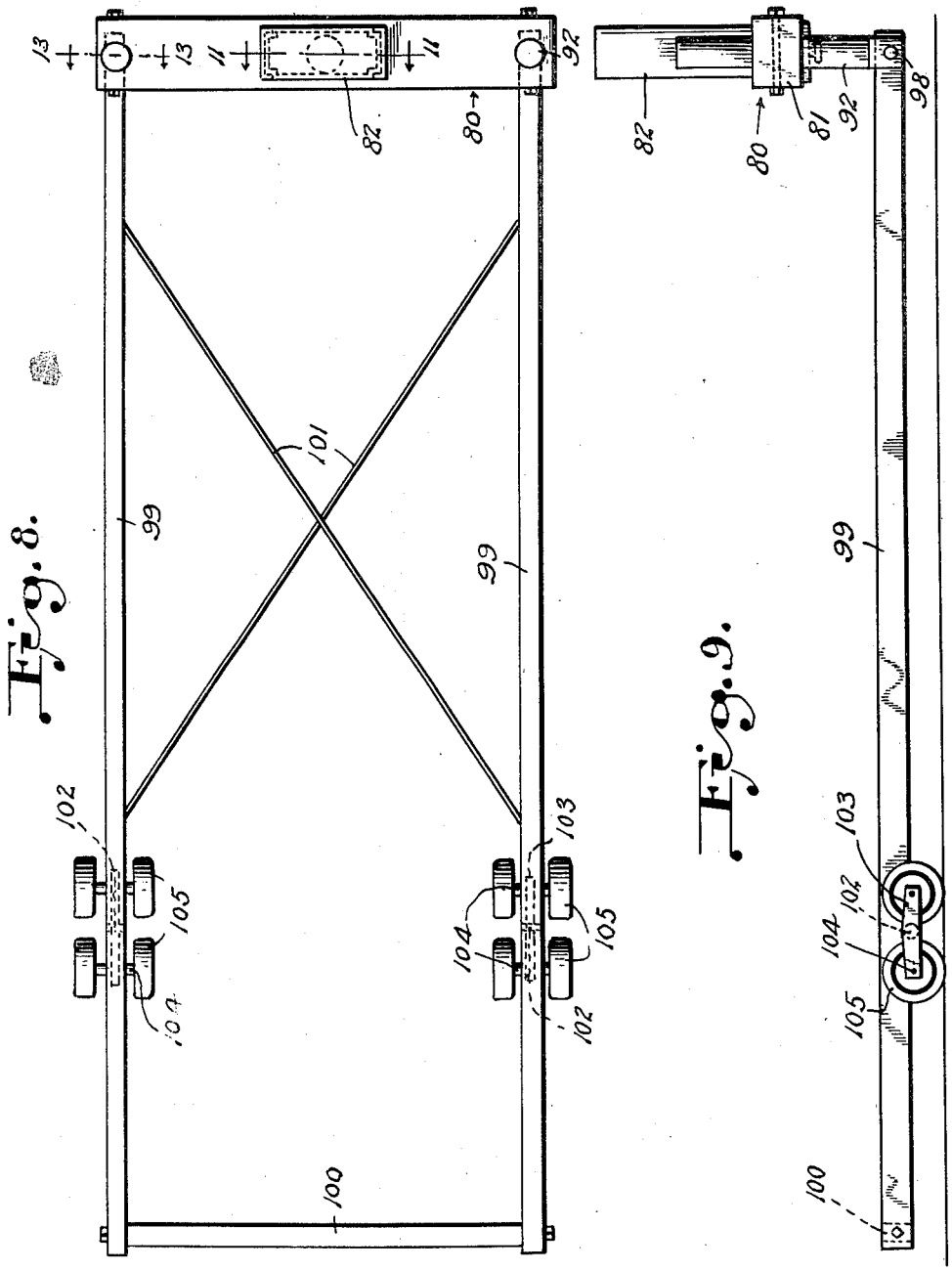
Walter G. Clark
INVENTOR
BY Snow Co.
ATTORNEYS.

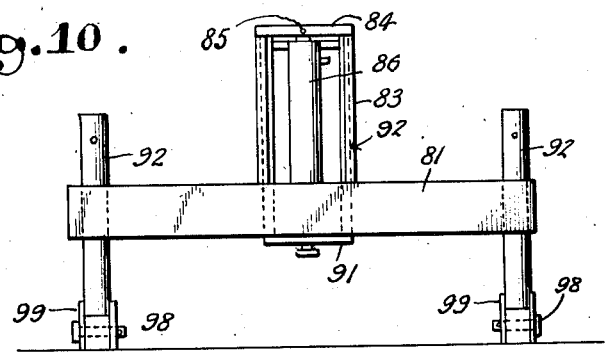
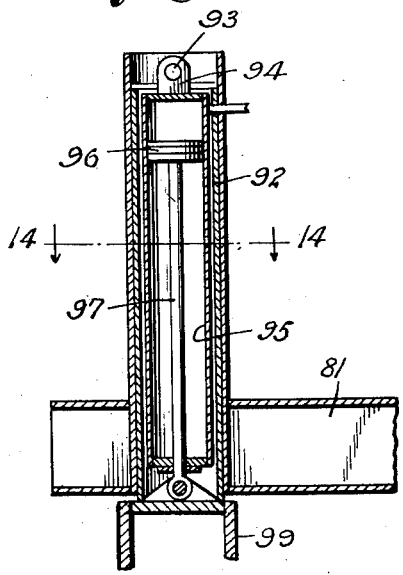
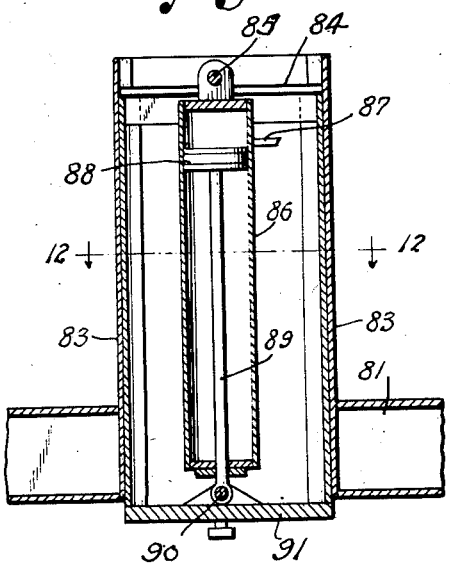
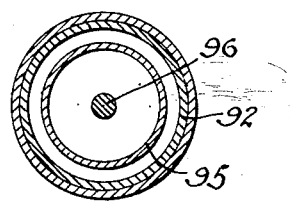
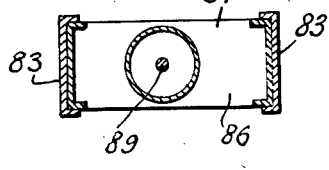
Walter G. Clark
INVENTOR

April 9, 1957　　　W. G. CLARK　　　2,788,145
HOUSE MOVING TRAILER
Filed March 10, 1955　　　7 Sheets-Sheet 6
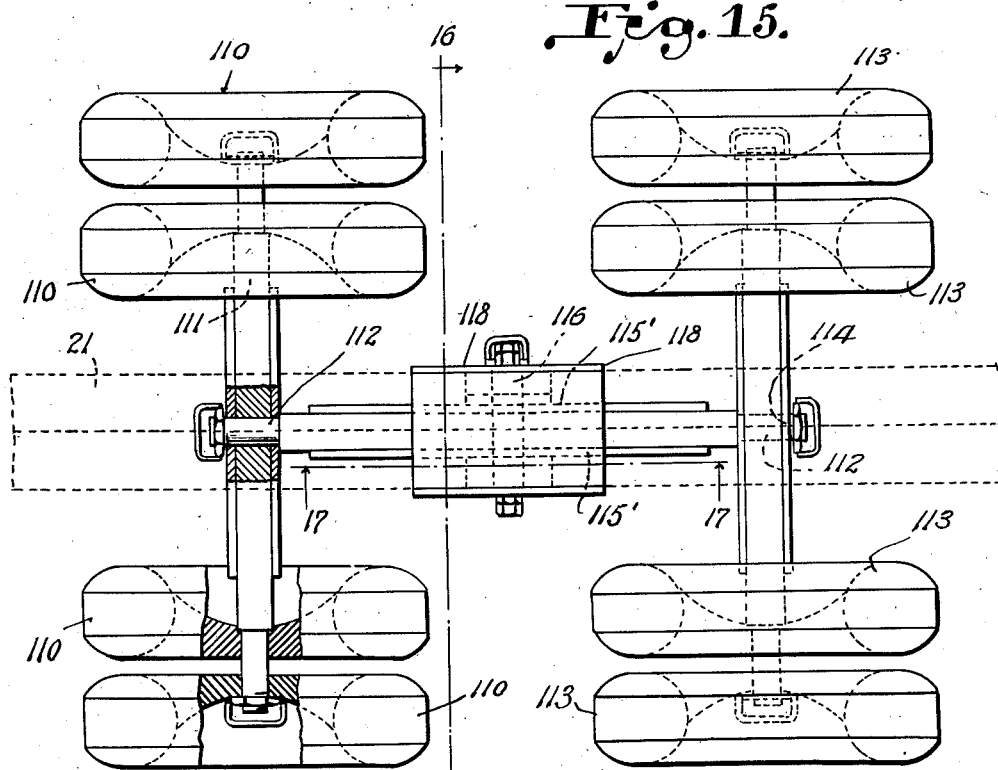
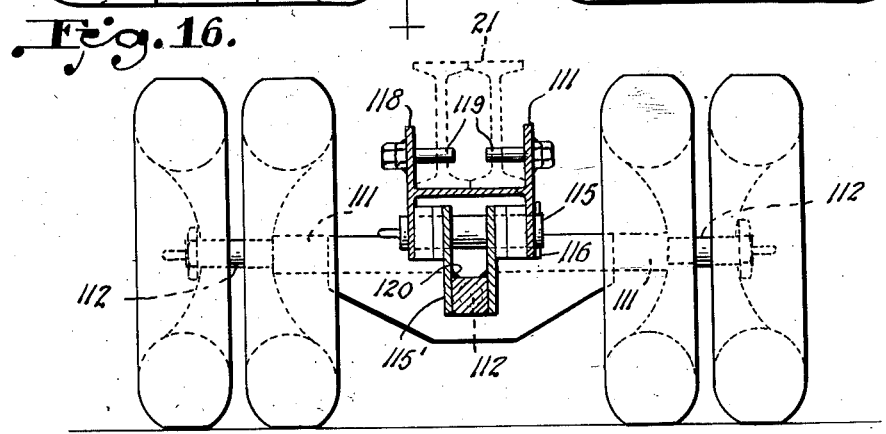
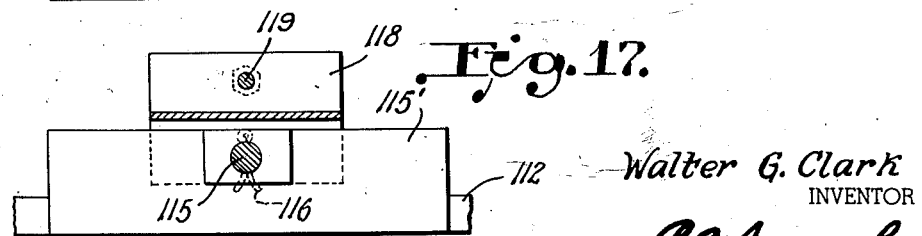
Walter G. Clark
INVENTOR
BY
ATTORNEYS.

April 9, 1957 W. G. CLARK 2,788,145
HOUSE MOVING TRAILER
Filed March 10, 1955 7 Sheets-Sheet 7
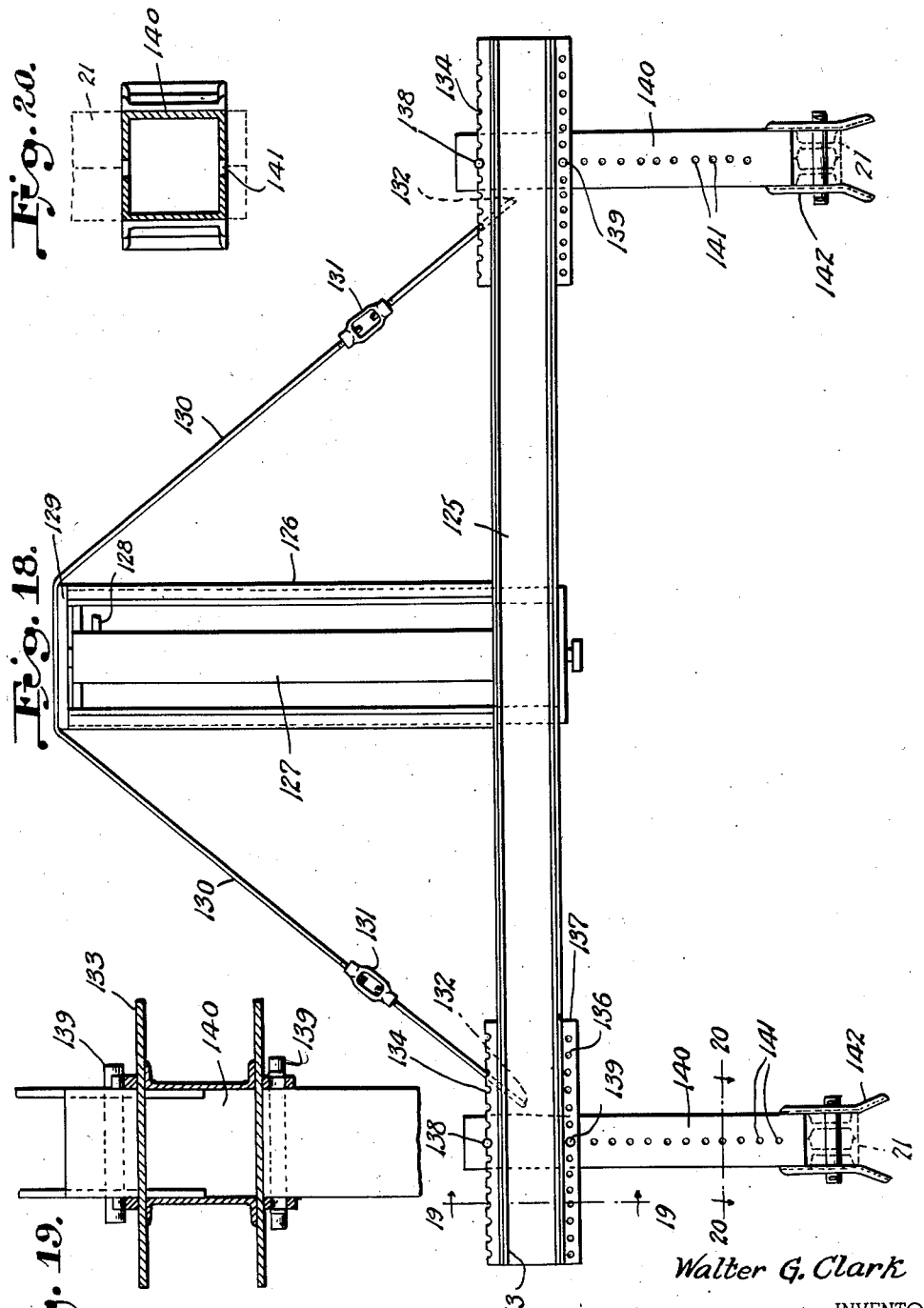
Walter G. Clark
INVENTOR United States Patent Office 2,788,145
Patented Apr. 9, 1957

2,788,145

HOUSE MOVING TRAILER

Walter G. Clark, Charleston, W. Va.

Application March 10, 1955, Serial No. 493,325

4 Claims. (Cl. 214—505)

This invention relates to a trailer, and has as its particular object the provision of an improved type of trailer for moving houses or similar structures and employs the principle of tilting the entire body of the trailer whereby the house or similar structure may be loaded or unloaded therefrom without the necessity of using additional structures.

In its primary application, the platform of the trailer is positioned adjacent the structure to be moved, and tilted to a proper angle so that the structure may be positioned thereupon. Hydraulic mechanism is employed for tilting the trailer, and after the structure has been placed thereupon it may be moved, by tilting of the trailer to a position adapted for transportation to a suitable locality, whereupon opposite tilting of the trailer will enable the structure to be removed therefrom to a suitable locality, whereupon opposite tilting of the trailer will enable the structure to be removed therefrom to a position for unloading.

A further object resides in the provision of a structure provided with a plurality of hydraulic cylinders whereby the weight of a structure may be moved to central position about a fulcrum centered on the trailer body, by successive actuation of the cylinders.

An additional object of this invention resides in the provision of such a structure moving trailer provided with suitable mechanism for elevating either end thereof as may be necessary or desired.

A still further object of the invention is the provision of an improved means whereby the wheels of a trailer of this character are arranged in multiple quadruple units, wherein there is provided an arrangement for permitting each quadruple group of wheels to tilt sidewise to accommodate inequalities in the ground surface over which the vehicle is being towed.

Still another object of the invention resides in the mechanical details of construction, all as are more fully disclosed in the accompanying drawings.

Still other objects reside in the combinations of elements, arrangements of parts, and features of construction all as will be more fully described hereinafter.

In the drawings:

Figure 6 is an enlarged detail constructional view partially in elevation and partially in section disclosing on an enlarged scale certain structural details of Figure 1.

Figure 7 is a sectional view taken substantially along the line 7—7 of Figure 3, as viewed in the direction indicated by the arrows.

Figure 8 is a top plan view of a modified form of construction.

Figure 9 is a side elevational view of the structure of Figure 8.

Figure 10 is an end elevational view of the structure of Figures 8 and 9.

Figure 11 is an enlarged sectional view taken substantially along the line 11—11 of Figure 8 as viewed in the direction of the arrows.

Figure 12 is a sectional view taken along the line 12—12 of Figure 11 as viewed in the direction of the arrows.

Figure 13 is an enlarged sectional view taken substantially along the line 13—13 of Figure 8.

Figure 14 is a sectional view taken substantially along the line 14—14 of Figure 13 as viewed in the direction indicated by the arrows.

Figure 15 is an enlarged top plan view partially in section disclosing an alternative arrangement of mounting the multiple wheels of the house trailer in such manner as to permit sidewise tilting thereof.

Figure 16 is a sectional view taken substantially along the line 16—16 of Figure 15.

Figure 17 is a sectional view taken substantially along the line 17—17 of Figure 15.

Figure 18 is an elevational view of a portion of the vehicle end raising mechanism.

Figure 19 is a sectional view on an enlarged scale taken substantially along the line 19—19 of Figure 18, and Figure 20 is a sectional view on an enlarged scale taken substantially along the line 20—20 of Figure 18.

Similar reference characters refer to similar parts throughout the several views of the drawings.

Figure 1:
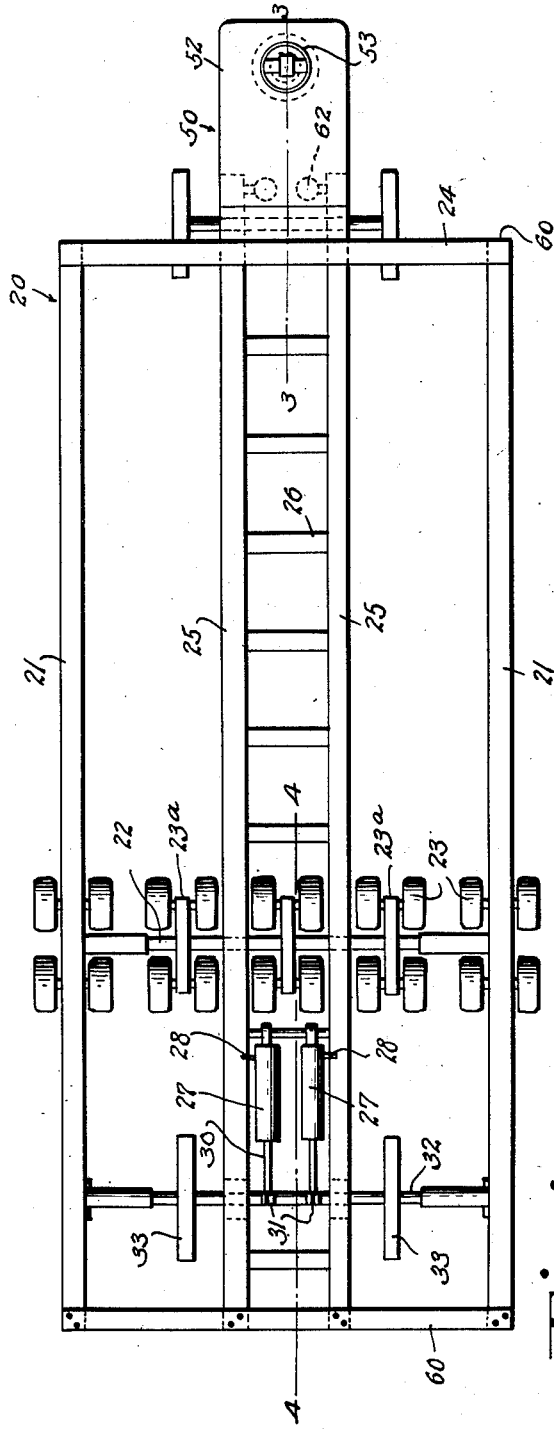
Figure 1 is a top plan view of one form of device embodying features of the instant invention.
Figure 2:
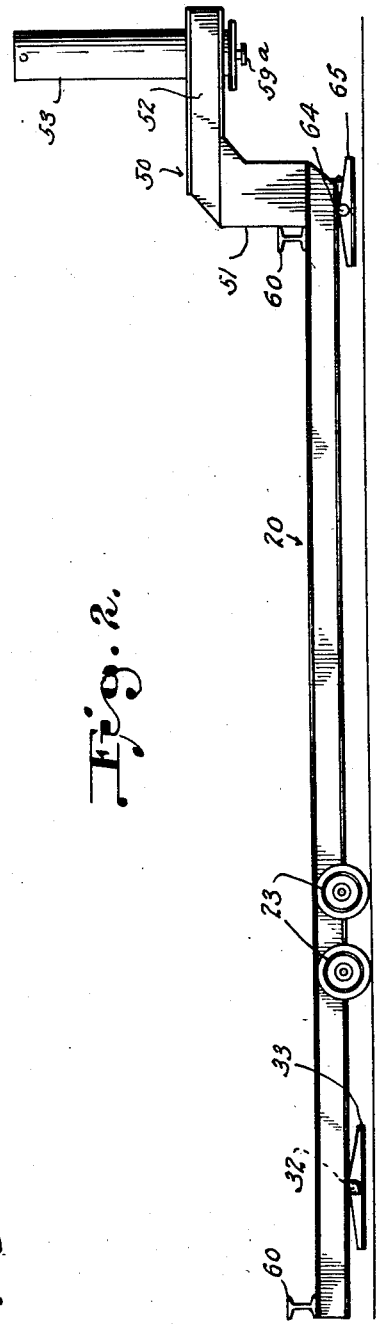
Figure 2 is a side elevational view of the structure disclosed in Figure 1.
Figure 5:
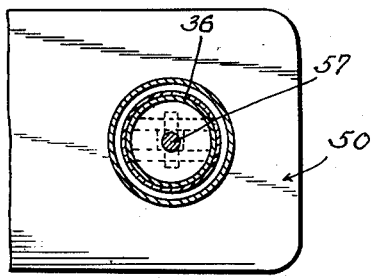
Figure 5 is a sectional view taken substantially along the line 5—5 of Figure 3 as viewed in the direction indicated by the arrows.
Figure 3:
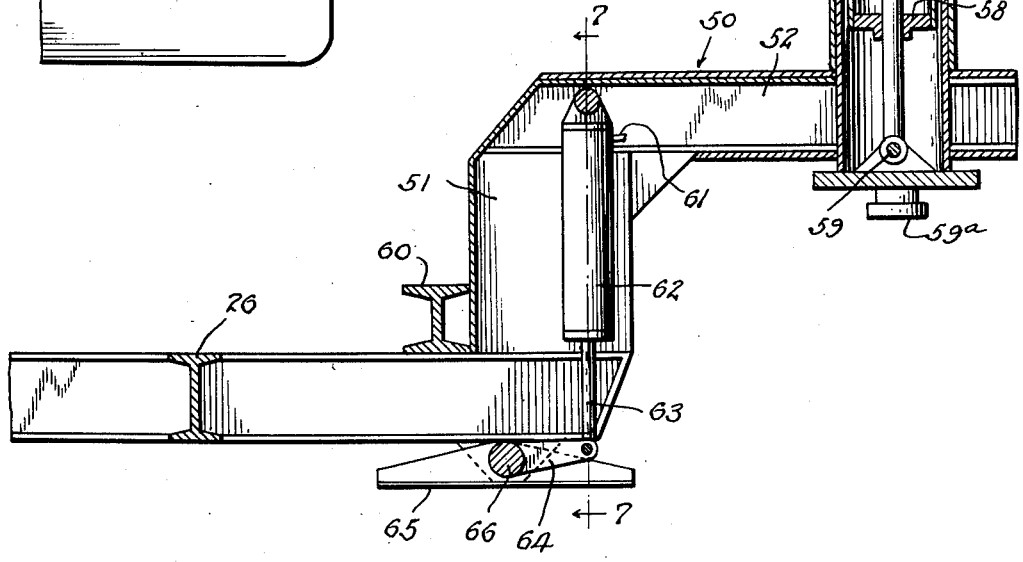
Figure 3 is a sectional view taken substantially along the line 3—3 of Figure 1 on an enlarged scale.
Figure 4:
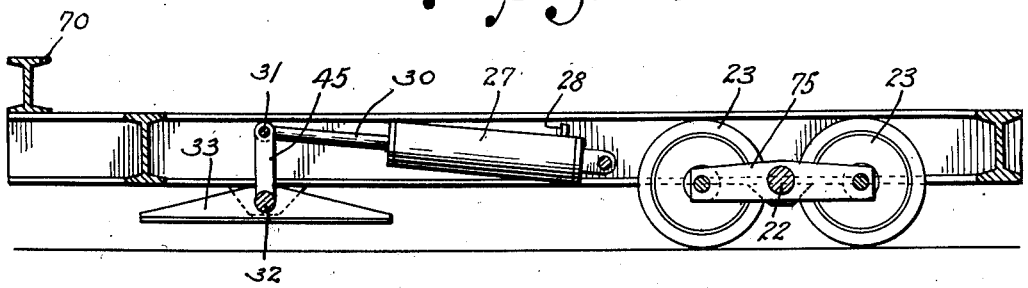
Figure 4 is a sectional view taken substantially along the line 4—4 of Figure 1, also on an enlarged scale, disclosing certain details of construction.

Having reference now to the drawings in detail, there is disclosed in Figures 1 to 7 inclusive a preferred embodiment of this inventive concept.

There is generally indicated at 20 a trailer body particularly adapted for the moving of houses or buildings or the like, which includes laterally extending side members 21, provided with suitable journals (not shown) which carry an axle 22 upon which are mounted a plurality of wheels 23. The wheels 23 are arranged in longitudinally aligned spaced pairs mounted on links 23a connected at their midpoints to axle 22 whereby the wheel assembly may pivot to accommodate different angles of inclination of the trailer body, and serve to support the weight carried on the trailer, and the side members 21 are connected at their opposite ends by transverse bars 24. A pair of intermediate bars 25 reinforced by cross bars 26 carry a pair of cylinders 27, supplied through conduits 28 with hydraulic fluid and containing pistons 29, connected to piston rods 30, which act through pivots 31 on an axle 32, to raise or lower pivoted supports 33 in a manner to be more fully described hereinafter.

The axle 32 is suitably journaled in supports 40 which are secured to the side members 21, and adapted for rotation therewithin. The pivots 31 connect pistons 30 pivotally as by means of links 45 to the rod or axle 32, and the opposite ends of the cylinders are pivotally connected as at 46 to a rod or bar 47 extending transversely between members 25.

The opposite end of the trailer embodies a gooseneck generally indicated at 50, which comprises a pair of vertical plates 51 and a pair of spaced apart horizontal plates 52, between which is mounted a cylindrical casing 53. The casing 53 incorporates a cylinder 54, pivotally connected to the casing as by a pivot 55 (see Figure 3) interiorly thereof, cylinder 54 containing a piston 56 connected to a piston rod 57 which extends through an aperture 58 in the base of the cylinder to a pivotal connection 59 with a fastening member 59a for the fifth wheel of a tractor towing vehicle. Admission of hydraulic fluid through an inlet 60 causes downward pressure on the piston, while subsequent ejection of a fluid through an aperture 61 in a cylinder 62 occasions subsequent downward movement of a piston rod 63, by virtue of a piston contained within the cylinder 62, substantially identical in construction to that of the piston 56, which will in turn act through a link 64 to pivot a shoe 65 about a pivot 66 to lower one end of the same to tilt the trailer to a load shifting position.

In the use and actuation of the device it will be understood that upon the introduction of fluid through the inlet 60, the end of the gooseneck trailer 20 will be elevated relative to the tractor or truck towing the same to permit a house or the like, beneath which the trailer has been previously positioned, to shift forwardly thereof and the subsequent injection of fluid through openings or conduits 61 in the cylinders 62 will tilt the shoes 65 to further shift the house thereon. Subsequent tilting of shoes 33 will center the building on the trailer for traveling. Release of the pressure in cylinders 27 tilts the trailer downwardly permitting the removal of the house or similar structure from the trailer, aided by the force of gravity. Transverse cross irons of T shape 70 are secured at opposite ends of the trailer, in order to retain the structure to be transported thereupon.

Having reference now to Figures 8 to 14 inclusive there is generally indicated at 80 a hydraulic lift assembly including a transversely extending cross piece 81, from the center of which rises a housing 82, which may be rectangular in form, including a pair of side channel irons 83, as best shown in Figures 11 and 12. Housing 82 includes a top plate 84, to which is pivotally secured as by means of a pivot 85 a hydraulic cylinder 86 adapted to be supplied with fluid 87. Within the cylinder 86 there is positioned a piston 88 connected to a piston rod 89, the lower extremity of which is pivoted as by a pivot 90 to a connecting plate 91 adapted to be connected to the conventional fifth wheel of a trailer tractor.

Each end of cross beam 81 is provided similarly with a cylinder housing 92, which contains, as best shown in Figure 13, a pivot bar 93 to which is secured a lug 94 positioned on the top of a hydraulic cylinder 95, the latter containing a piston 96 and a piston rod 97. The lower ends of cylinder housings 92 extend a substantial distance below cross bar 81, and are adapted to have connected thereto as by means of bolts 98 or the like, the ends of channel beams 99, which bolts may be readily released for a purpose to be described hereinafter. The opposite ends of beams 99 are connected by a cross beam 100, and intermediate diagonally disposed reinforcing members 101 may be provided as desired.

Adjacent the rear end of each of the beams 99 is positioned a stub axle 102 which carries a tiltable link 103, at the opposite ends of which are mounted transverse axles 104, which carry wheels 105 for supporting a load.

In the use and operation of the device, the assembly 80 is first positioned by means of the connecting plate 91 on the fifth wheel of a tractor trailer. The beams 99 are then positioned beneath a house or similar structure to be moved, and connected as by bolts 98 to the ends of cylinder housings 92.

A suitable fulcrum point is provided between the bolts 98 and wheels 105, as by building up a brick structure or the like, and the trailer is tilted until the weight of the structure to be moved rests squarely upon the beams 99 (this being effected by means of the introduction of hydraulic pressure selectively into cylinders 86 and 95), and as the weight of the structure rests firmly on the supporting beams 99, the structure is then moved to traveling position, the fulcrum having been removed, and the weight of the load resting on the wheels 104.

Having particular reference now to the construction disclosed in Figures 15 to 17 inclusive, there is shown a quadruple or eight-fold group of wheels, wherein there are four wheels 110 mounted on a tubular axle 111, which in turn is mounted on a longitudinally extending axle 112, which extends longitudinally of the frame members 21, or conversely the connecting bars 23a, as best shown in Figure 1. The multiplicity of wheels 110 correspond to a similar series of wheels 113 in alignment with the preceding wheels, and also connected in a manner to be more fully described hereinafter as at 114 to a longitudinally extending shaft 112. The shaft 112 is contained between parallel side plates 115', which are pivotally mounted on a stud 116 held in position by cotter pins 117, and arranged between the side walls of an H-beam 118. This H-beam 118 is connected by stud shafts 119 (see Figures 16 and 17) to the I-beams comprising the basic structure of the side members 21. The arrangement is thus such that with the soldered connections 120 between side plates 115', shaft 115 and axle 112, the pairs of wheels on opposite sides of the connection comprised of the H-beam 118, each series of pairs of wheels arranged transversely across the carrier may tilt sidewise relative to each other pair of wheels if necessary to accommodate any qualities in terrain.

In Figures 18 to 20 inclusive, there is disclosed a modified form of raising the forward axle and adjusting the same in order to more properly accommodate a house on the vehicle. In this modification, the cross bar 125 has mounted thereon a hydraulic cylinder housing 126 containing hydraulic cylinder 127 provided with fluid through an inlet 128. A top plate 129 has connected thereacross a pair of guide wires 130 provided with turnbuckles 131, and connected at their lower extremities as at 132 to the cross bar 125. A pair of oppositely disposed plates 133 provided with serrations 134 are positioned at either end of cross bar 125, the lower edges of said plates being provided with apertures 136 and a flange 137. Upper and lower pins 138 and 139 respectively engage in the respective serrations 134 and apertures 136, to secure the cross bar 125 to a pair of oppositely disposed legs 140, each of which is provided with a longitudinally aligned series of apertures 141, and feet 142 similar to those described in the previous modification of the form shown in Figure 10.

In this modification, the upper and lower pins 138 and 139 serve to hold the forward and rear side plates 133 into close juxtaposition with the side plates 140 of the feet.

Obviously, by means of this modification and removal of the pins, adjustment of the feet 142 on their shafts 140 may be readily accomplished, and reinsertion of pins 138 and 139 will serve to secure the parts in related assembly.

The arrangement is thus such that upon actuation of hydraulic cylinder 127, the end of the vehicle adjacent the tractor may be readily adjusted to a desired height to tilt the chassis or frame and thus position the house accordingly on the vehicle frame.

From the foregoing it will now be seen that there is hereinprovided an improved vehicular trailer which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

I claim:

1. In a tiltable truck trailer of the low bodied type in combination, a body frame, supporting wheels therefor, a fifth wheel coupling means at one end of said frame, a hydraulic cylinder carried by said coupling means, said coupling means including a connection movable by said cylinder adapted to engage the fifth wheel of a tractor truck, additional hydraulic cylinders adjacent said first mentioned cylinder operable successively to further raise the vehicle, supporting feet connected to said second cylinders for elevating the end of said body adjacent said coupling means to tilt said body to loading and unloading position, a third set of hydraulic cylinders adjacent the rear end of said body, and supporting feet connected to said third set of hydraulic cylinders operable to raise the rear end of said body to level the same on said frame and equally distribute the weight thereupon.

2. In a tiltable truck trailer of the low bodied type in combination, a body frame, supporting wheels therefor, a gooseneck construction at one end of said frame, a hydraulic cylinder carried by said gooseneck, a connection movable by said cylinder adapted to engage the fifth wheel of a tractor truck, additional hydraulic cylinders adjacent said first mentioned cylinder operable successively to further raise the vehicle, supporting feet connected to said second cylinders for elevating the end of said body adjacent said gooseneck to tilt said body to loading and unloading position, and a third set of hydraulic cylinders adjacent the rear end of said body operable subsequently to said second cylinders to raise the rear end of said body to level the same on said frame and equally distribute the weight thereupon, said last mentioned cylinders being horizontally positioned within said body to afford a flat supporting surface for said body.

3. In a tiltable truck trailer of the low bodied type in combination, a body frame, supporting wheels therefor, a gooseneck construction at one end of said frame, a hydraulic cylinder carried by said gooseneck, a connection movable by said cylinder adapted to engage the fifth wheel of a tractor truck, additional hydraulic cylinders adjacent said first mentioned cylinder operable successively to further raise the vehicle, supporting feet connected to said second cylinders for elevating the end of said body adjacent said gooseneck to tilt said body to loading and unloading position, and a third set of hydraulic cylinders adjacent the rear end of said body operable subsequently to said second cylinders to raise the rear end of said body to level the same on said frame and equally distribute the weight thereupon, said last mentioned cylinders being horizontally positioned within said body to afford a flat supporting surface for said body, said second and third mentioned cylinders being operable to raise and lower pivoted supporting feet.

4. In a tiltable truck trailer of the low bodied type in combination, a body frame, supporting wheels therefor, a gooseneck construction at one end of said frame, a hydraulic cylinder carried by said gooseneck, a connection movable by said cylinder adapted to engage the fifth wheel of a tractor truck, additional hydraulic cylinders adjacent said first mentioned cylinder operable successively to further raise the vehicle, supporting feet connected to said second cylinders for elevating the end of said body adjacent said gooseneck to tilt said body to loading and unloading position, and a third set of hydraulic cylinders adjacent the rear end of said body operable subsequently to said second cylinders to raise the rear end of said body to level the same on said frame and equally distribute the weight thereupon, said last mentioned cylinders being horizontally positioned within said body to afford a flat supporting surface for said body, said second and third mentioned cylinders being operable to raise and lower pivoted supporting feet, said supporting wheels comprising longitudinally disposed pairs of wheels connected by links, and an axle, said links being pivotally mounted on said axle at their midpoints.

References Cited in the file of this patent

UNITED STATES PATENTS

| | | |
|---|---|---|
| 2,425,521 | Ellberg | Aug. 12, 1947 |
| 2,588,001 | Holland | Mar. 4, 1952 |
| 2,689,137 | Iddings et al. | Sept. 14, 1954 |
| 2,717,707 | Martin | Sept. 13, 1955 |

FOREIGN PATENTS

| | | |
|---|---|---|
| 714,620 | Germany | Dec. 3, 1941 |